(12) United States Patent
Scott

(10) Patent No.: US 7,294,017 B2
(45) Date of Patent: Nov. 13, 2007

(54) ELECTRICAL RECEPTACLE AND JUNCTION BOX FREE OF WIRE-NUTS

(76) Inventor: James L. Scott, 796 Bear Rd., Cowlesville, NY (US) 14037

( * ) Notice: Subject to any disclaimer, the term of this patent is extended or adjusted under 35 U.S.C. 154(b) by 0 days.

(21) Appl. No.: 11/274,981

(22) Filed: Nov. 15, 2005

(65) Prior Publication Data

US 2006/0105626 A1    May 18, 2006

Related U.S. Application Data

(63) Continuation-in-part of application No. 10/990,035, filed on Nov. 16, 2004, now abandoned.

(51) Int. Cl.
*H01R 13/66* (2006.01)
(52) U.S. Cl. ...................................... 439/535
(58) Field of Classification Search ................. 439/535
See application file for complete search history.

(56) References Cited

U.S. PATENT DOCUMENTS

| | | |
|---|---|---|
| 3,716,651 A | 2/1973 | Werner |
| 4,082,915 A | 4/1978 | Silver |
| 5,012,043 A | 4/1991 | Seymour |
| 5,352,850 A | 10/1994 | Norris |
| 6,191,361 B1 | 2/2001 | Matty |

*Primary Examiner*—Briggitte R. Hammond
(74) *Attorney, Agent, or Firm*—Patricia Costanzo

(57) ABSTRACT

Molded electrical connection junction boxes and connection inserts for use in existing junction boxes eliminates wire-nuts. Wiring terminals, molded into the box, provide reversible electrical connections between conductor wires and other conductor wires or between conductor wires and wires from electrical devices. The box has least one opening through which at least one electrical conductor may be inserted. An open front face receives an electrical device, such as a plug receptacle or a switch plate. At least one wiring terminal block is integrally molded onto said connection box or onto an insert device. The wiring block comprises at least aperture for the insertion of the wires to be connected and one for receiving a wire securing means, such as a set screw. The box may be made of any moldable material, such as plastic or the like and the wiring terminal may be made of a conducting or non-conducting material.

20 Claims, 8 Drawing Sheets

ELECTRICAL RECEPTACLE AND JUNCTION BOX FREE OF WIRE-NUTS

CROSS-REFERENCE TO RELATED APPLICATIONS

This application is a continuation-in-part of application of U.S. Ser. No. 10/990,035 filed on Nov. 16, 2004 now abandoned.

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISK APPENDIX

Not Applicable

BACKGROUND OF THE INVENTION

The present invention relates generally to electrical receptacle connector boxes and, more particularly, to electrical connector boxes having terminal connectors for allowing economical, safe, quick, and easy wiring of both electrical devices and electrical connectors without the use of wire-nuts, and for use with existing junction boxes the electrical connector box is available in a "mini" form providing for a terminal connector insert. Wiring terminals blocks of conducting or non-conducting material, molded into the box and inserts, provide reversible electrical connections between conductor wires and other conductor wires or between conductor wires and electrical devices.

The background information discussed below is presented to better illustrate the novelty of the present invention. This background information is not admitted prior art.

In order to provide for electrical power inside a building, wires carrying electricity are brought into the building from an outside source. Generally, this means connecting an electrical power supply line (also referred to as a wire, a lead wire, or an electrical conductor) to a main box just inside or outside the building. Once inside, electrical conductors must be routed through the walls of the building to the many areas where power is desired and/or required. Once the electrical conductors are positioned within the structure, they must then be connected to either electrical devices or to continuing electrical conductor supply lines to ultimately supply electrical power for an end use, such as for light switches, plug outlets, and the like. Electrical conductors are usually connected to other electrical conductors or to electrical devices within a junction or receptacle box, respectively. A junction box is essentially a container to house electrical conductor connections. The actual electrical connections between a lead line and a wire emanating from an electrical device, such as a light-switch, may be first encased inside of a plastic "wire-nut" which is nothing more than a thimble-shaped and sized plastic cup designed to force the ends of wires together. The wire-nuts with their protruding wires are then housed in an electrical connection box. If a wire-nut is not used to make the connection, electrical tape may be used, although this is considered an unsatisfactory solution as it is well-known that electrical tape loses its properties with time.

Wire-nuts, while supposedly providing for an improvement over the use of electrical tape to secure electrical connections, provide little protection against wires that are connected within the nut becoming disconnected. This is a particular problem where several wire-nut encased wires are positioned within a junction or receptacle box and then must be hard-pressed into the box so that a switch and a switch plate cover is able to be secured over the opening of the box. Squeezing the wire-nut encased wires into the box in such a manner often results in broken connections.

In fact, wires that have been connected within a wire-nut become disconnected so frequently that some wire-nuts are now designed to be crimped. That is, once the wires to be connected are connected and placed inside of the wire-nut, the wire-nut is permanently crimped closed using a wire-nut crimper to ensure that the connected wires inside of the nut stay connected. One of the negative repercussions of crimping wire-nuts, however, is that if a repair or replacement is required after the wire-nut has been crimped, the wires must be cut free from the crimped wire-nut, as it is impossible to remove the wires from the wire-nut after the wire-nut has been crimped. Cutting the wires, however, results in shortened wires which may complicate or eliminate the possibility of any reconnection. This of course, will then require a whole new switch plate with new wires or the wires will have to be spliced which can pose additional safety concerns. And, of course, incomplete crimping may cause the same problems as uncrimped wire-nuts cause that is, a loose connection.

Attempts have been made to provide for securing an electrical receptacle within an outlet box in electronic communication with wiring systems. One example offers an electrical junction box configured to receive electrical conductors through openings in each of the end panels of the box. Each electrical conductor is held in place by clamping means that are located adjacent to an opening. The clamping means, however, includes a contact shoe which is initially formed with the housing, but which is designed to be separated from the housing when the conductor is to be clamped. Breaking a tab that initially anchors the shoe to the housing enables the shoe to be brought into clamping engagement with the conductor at which time the shoe is secured to the housing. However, once the shoe is broken away from the housing to clamp the conductor to the box, it would be difficult to use the box again. If a receptacle or wires need to be replaced or relocated, the box also would have to be replaced. Moreover, such devices do not offer means to connect wires to each other. They are designed only to hold a wire cable secure within the box. These devices require many design features that are structurally complex, suggesting that its manufacturing cost is likely to be relatively high, and thus, unlikely to be universally affordable. It certainly would be desirable to have an affordable, uncomplicated outlet box that provided for the simple, easy, and rapid attachment and detachment of wires as many times as required, without the need to replace the box or any parts of the box.

Another plug and switch receiving device that attempts to offer improved means for securing wires, comprises a complex, multi-part receptacle box that requires at a minimum two discrete pieces that must be attached to each other before the box can be attached to a structure so that a plug, switch, or similar device is able to be attached to a electrical conductor within the box. Another example comprises a plug receptacle that must be first attached to a first front part of a receptacle box and then to a second inner part of the box using spring clips that are designed to extend through the first and second parts to reach a third part at which point connection is made between electrical device wires and a electrical conductor. Such spring-type clips, however, are prone to a loss of their springiness, to breakage, and/or rusting, if metal. This type of custom made device is complicated and requires all of its parts to be specially made, which of course adds significantly to the cost of manufacture. Such devices cannot accept off-the-shelf receptacles or switches as they do not come provided with the requisite prongs for fitting into the spring clips.

Another attempt teaches a specialized style of electrical receptacle outlet box that offers off-set mounting panels adjacent to either side of the box opening. Each mounting panel is angled away from the box opening to allow for easy access of the wiring terminals that are mounted on the interior side of these panels and to allow for conventional wiring to be pre-terminated within the outlet box. Each wiring terminal is shown having a single aperture to accept both wires and wire holding means, which could compromise the integrity of the wires that are positioned in the aperture. Additionally, the atypical shape of such boxes suggests that they would not likely be an acceptable candidate for use in commercial or home construction. Furthermore, these unusually shaped boxes would be much more complex to manufacture and thus are likely to more costly.

Accordingly, it would be a significant improvement in the art to provide for an economical, easy to use, electrical receptacle box of simple design that would allow a user to rapidly and repeatedly, if required, pre-wire or wire conventional residential, commercial, or industrial buildings, especially prior to enclosing such wiring systems behind drywall or other interior wall finish without using wire-nuts, such that the remaining wiring of standard electrical receptacles is easily and safely completed.

SUMMARY

The present invention satisfies the urgent need in the art for a molded box-like container that provides for either an electrical wire connector or junction box that eliminates the need for the ubiquitous nut connectors of questionable safety that are presently relied on to connect conductor wires inside a junction box. The molded box is of simple, streamlined, and economical construction. The electrical receptacle box according to the principles of the present invention allows a user to rapidly and repeatedly pre-wire, wire, or re-wire conventional residential, commercial, or industrial wiring systems. Additionally, the present invention satisfies an urgent need in the art for an electrical wire connector insert for use in existing junction boxes eliminating the need for the ubiquitous nut connectors. The electrical receptacle insert according to the principles of the present invention provides for a user to rapidly pre-wire, wire, or re-wire conventional residential, commercial, or industrial wiring systems using presently available junction boxes. Wiring terminals blocks made of conducting or non-conducting material, molded into the box and inserts, provide reversible electrical connections between conductor wires and other conductor wires or between conductor wires and electrical devices.

The present inventions successfully alleviate the problems commonly suffered when wire-nuts or crimped wire-nuts are used to make wire connections in presently available electrical connector or junction boxes. The present invention provides for a box that is molded in one piece where the wiring terminals (also referred to as block connectors, block terminals, or terminal blocks) are molded into the box to become an integral part of the box. These wiring terminals comprise small, mainly hollow, box-like interior extensions positioned within a junction box of any desired size or shape. The number of wiring terminals in a box is determined by the number of connections required. The low cost of these boxes, however, would allow multiple wiring terminals to be a part of each box, so that various box models would not be required. Within the body of each wiring terminal is a space that is accessible by a first and a second aperture. The wires from the electrical conductor and the electrical device are placed into one aperture and secured by the tightening of a screw, or the like, that is placed into the second aperture. Tightening of the screw prevents the wires from inadvertently becoming disconnected, yet loosening of the securing means allows the connected wires to be disconnected, if necessary, and reconnected, if desired. The fixed position of the wiring terminals ensures that once the connected wires are fixedly secured and protected by the securing means, the wire connection need not be disturbed and thus is safe from having the connection broken, unlike connections that are made within moveable wire-nuts. However, when there is a need to disconnect the connected wires, the screw or other securing means is easily loosened and the wires removed without any need to cut the wires or to prevent further use of the device. Moreover, the tightening means is usually a ubiquitous means, such as a screw, which means is easily replaced at minimal cost in case the original tightening means is misplaced or damaged.

For those situations where it would be desirable to use presently available junction boxes, the present invention also teaches a non-conducting electrical wire connector insert that fit easily, yet securely, in existing junction boxes. Following the principles of the present invention, the insert is molded from a non-conducting material and is shaped and sized to be dropped into preexisting junction boxes. The insert provides for easy and rapid connection of wires, such as for connecting the wires from a power source to the wires that are part of a switch box. Each insert, as with each connector box, is capable of accepting one or a plurality of wire sets for connection of the wires in each set. The inserts, as with the connector boxes, may be made entirely from a non-conducting material, or they may be made of plastic with metal connector blocks. Inserts made entirely of a non-conducting material, such as plastic are ideal for use in metal junction boxes. Alternatively, the frame of the inserts may be made of plastic containing press-fitted metal connector blocks for use in junction boxes made of plastic. Each wire connector block has at least one cavity for accepting wires to be electrically connected. The wires are held in position in the cavity by connector means, such as a set screw. The connector block has at least one aperture for receiving a connector means, which aperture is in communication with the at least one cavity for receiving the wires to be electrically connected. The connector means is positioned, such as by screwing, for holding the connected wires in position in the cavity. The insert is of extremely simple, streamlined, and economical construction and provides the same advantages as the full-sized connector. The number of wiring terminals in an insert is determined by the number of connections required in each junction box. The low cost of these inserts, however, would allow multiple wiring terminals to be a part of each box, so that various box models would not be required.

In addition to providing for easier, more rapid, more secure, and safer connections within an electrical junction box, as well as eliminating the need for wire-nuts, or for any other type of wire connector, such as electrical tape (which it is well-known is not a recommended choice), the present invention, both the full-sized connector box and the insert, which is analogous to a mini-sized connector box, provides more room in the box for switches, receptacles, or both. For example, in the case of boxes designed to accept multiple switches or receptacles, the box would have multiple wiring or block terminals (that are either all plastic or metal). All block terminals are molded into the box or pressure fitted into the molded insert when they are manufactured and would be made of a known, or yet to be known, conducting material, such as copper or aluminum or, for use in metal boxes, of a non-conducting material, such as plastic, glass, ceramic, and the like. Set screws, or other means for securing the connecting wires, are provided with each box. Moreover, no extra parts are needed for the installation or of the junction box as described herein, preventing the need for last minute trips to the hardware store because a required piece of hardware is missing.

Because the junction box and the insert may be molded in one piece from a variety of non-conductive materials, such as plastic, it can be mass-produced at low cost making the device attractively affordable to all. If desired, however, the box may be made from a variety of other materials, such as fiber glass or ceramic, and even such conductive materials, such as steel, aluminum, or the like, may be used provided that any conductive material would insulated. Additionally, the molding process is amenable to the easy addition of an anchoring device to the box, such as a series of eye holes to be added to the molded junction box during production without incurring significant additional cost, while simultaneously increasing the versatility of the device. Also, as the box can be made through any standard molding technique, a wide range of shapes and sizes, depending on the desired use, may be contemplated while within the scope of the invention. For example, the size, and perhaps the shape, of a box used for the installation of a light switch would be different than that of a box to be used as a junction box for five electrical conduits.

All of these advances and advantages are made available by providing for a molded electrical receptacle box, comprising: a back panel; a first side panel and a second side panel; a first end panel and a second end panel; where the back panel, the side panels, and the end panels are adapted to form accessible internal volume, where the end panels have at least one opening that is configured to receive at least one electrical conductor therethrough for positioning in the accessible internal volume of the molded electrical connection box, and where an open front face, which is opposite to the back panel, is configured to receive an electrical device, and where at least one wiring terminal block is integrally molded onto the connection box providing for reversible electrical connection between the conductor and an electrical device.

Moreover, the molded electrical receptacle box, further comprises wherein the wiring terminal is designed as a block terminal, which terminal may be made of a conducting material that may or may not be faced with a non-conducting material.

The molded electrical receptacle box provides for an electrical conductor to be secured into at least one of the block terminals by a securing means, which may be a set screw or the like.

The electrical device that is received into the open front face may be any type of electrical device such as a plug receptacle or a switch, for example.

The molded electrical receptacle box further comprises wherein the block terminal has an at least first aperture opening to an at least second aperture, wherein at least one electrical conductor and at least one wire from an electrical device are positioned into at least one second aperture wherein electrical connection is made between said electrical conductor and electrical device and wherein said electrical connection is secured by a securing means that is positioned into said at least first aperture.

The molded electrical receptacle box may be molded by any known molding means and, therefore, may be manufactured from a plastic, metal, or other material. The molded electrical connection box may be molded with means for mounting the box to a support.

Another molded electrical box, comprises: a back face panel; a first side panel and a second side panel; a first end panel and a second end panel; where the back panel, the side panels, and the end panels are adapted for forming accessible internal box volume, and where the end panels have at least one opening configured to receive at least one electrical conductor therethrough for positioning in the accessible internal volume of the box, where at least one wiring terminal is integrally molded onto the connection box, wherein the wiring terminals provide for reversible electrical connection between electrical conductors, in the manner that is discussed above.

The molded electrical junction box wherein the wiring terminal may be a block terminal, wherein the block terminal may be made of a conducting material that may, or may not be, faced with a non-conducting material.

A favored embodiment provides for a wire connector insert, for insertion into a junction box, comprising: a. a frame; b. at least one wire terminal integral within the frame, the wire terminal for receiving at least a first and second wire, c. at least one means for fastening the at least first and second wire together within the wire terminal, the fastening means providing for reversibly firmly connecting the at least first and second wire together. The frame is sized and shaped for being held securely within a junction box and is made of a non-conducting material, which material may be of any desired non-conducting material, such as plastic, ceramic, or glass. If desired, the insert is available with the at least one wire terminal made of a non-conducting material. Alternatively, the insert is available with the at least one wire terminal made of a conducting material, which is insulated from its environment.

Another favored embodiment provides for a wire connector insert, comprising: a. a frame; b. at least one cavity for receiving at least one set of wires to be connected, the cavity integral with the frame; c. at least one means for fastening the at least one set of wires to be connected, and d. at least one hollow in communication with the cavity, the hollow for receiving the at least one means for fastening, wherein when the at least one means for fastening is received into the hollow for reversibly firmly connecting the at least one set or a plurality of sets of wires to each other with the cavity. The insert is sized and shaped to be received and held snugly within a junction box, wherein the insert frame is made of a non-conducting material. The insert may comprise two or more cavities for receiving wires to be connected and at least one of the hollows further comprises two or more hollows where each hollow is in communication with one cavity providing for wire connection. Where the frame is made of a non-conducting material, at least one connection block for connecting the wires to be connected may be conducting and may be positioned within the frame of the insert by press insertion. In this favored embodiment the at least one cavity and the at least one hollow are positioned within the conducting connection block, which is electrically insulated from the environment outside of the frame. If desired, this embodiment is available with at least two cavities for receiving wires to be connected and at least two hollows each of which is in communication with one cavity. Importantly, this favored embodiment is available with the frame is made of a non-conducting material having at least one non-conducting connection block for connecting the wires to be connected, the non-conducting block molded together with and within the frame.

A yet another favored embodiment, provides for a molded, non-conducting, electrical receptacle connection box, comprising a molded, non-conducting electrical receptacle connection box, comprising: a. a non-conducting frame; b. at least one non-conducting wire terminal for receiving wires to be connected, the wire terminal structurally molded within the frame having: i. at least one non-conducting wire terminal cavity for receiving wires to be connected; ii. at least one means for reversibly firmly connecting the wires to be connected within the wire terminal cavity, and iii. at least one non-conducting hollow structurally integrated into the frame in communication with the cavity, said hollow for receiving the at least one means for reversibly firmly connecting the wires to be connected within the cavity.

Still other benefits and advantages of this invention will become apparent to those skilled in the art upon reading and understanding the following detailed specification and related drawings.

BRIEF DESCRIPTION OF THE DRAWINGS

In order that these and other objects, features, and advantages of the present invention may be more fully comprehended, the invention will now be described, by way of example, with reference to the accompanying drawings, wherein like reference characters indicate like parts throughout the several figures, and in which.

DEFINITIONS

Figure 1:
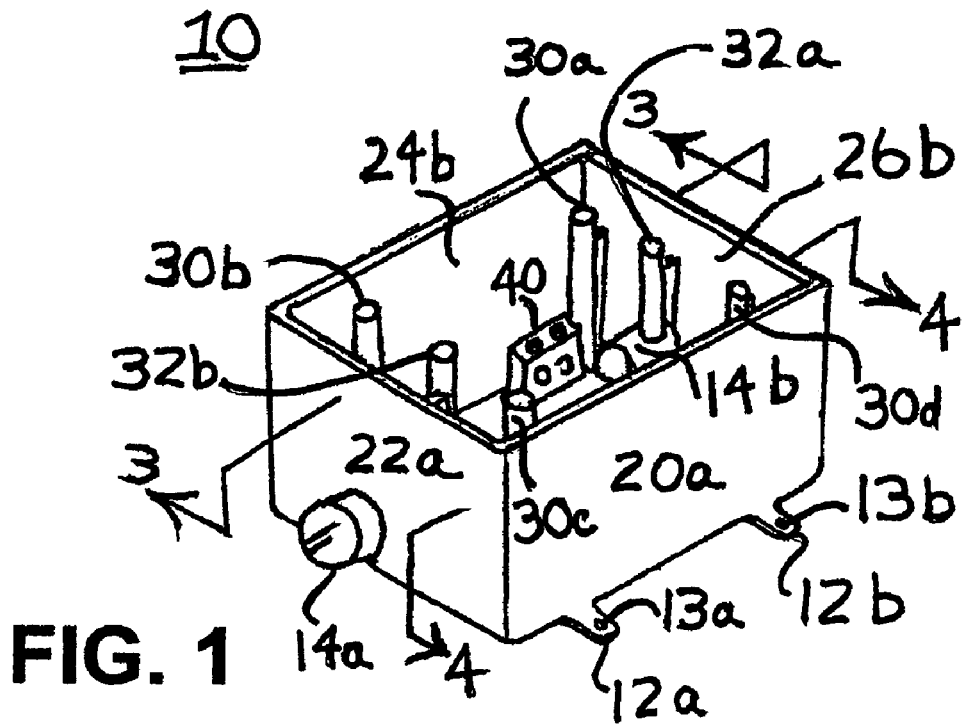
FIG. 1 is a perspective top view of the junction box according to principles of the present invention.

Integral, as used herein, refers to a whole made up of parts, wherein the parts are formed united as one unit and are all of one and the same single piece.

Molded, as used herein, refers to any process wherein an object is produced as one solid piece, either by casting, forming, injection into a mold, or any other acceptable means that provides for a integral construction.

Electrical Device, as used herein, refers to any device that either uses or implements electricity, which includes, but is not limited to, plug receptacles, switch plates, and the like.

Block or Wiring Terminal, as used herein, refers to a means for connecting electrical wires and may be referred to as terminal blocks, connectors, connecting blocks, wire connectors and the like. The block terminals comprises a small, relative to the electrical connector box of which it is a part, container having at least two apertures that are internally connected to one another for receiving connecting wires and securing those wires through the use of securing means, such as screws. Following the principles of the present invention, the block terminal(s), which may be of curvilinear as well as block form, provide for rapid, safe, and secure connection of electrical wires and, if desired, provides for the connection(s) to be unsecured without damaging the wires, the securing means, or the block terminal.

Electrical Conductor, as used herein, refers to any wire or cable that carries an electrical current.

A LIST OF THE REFERENCE NUMBERS AND RELATED PARTS OF THE INVENTION

10 A molded electrical junction or receptacle connector box according to the teachings of the present invention.

12a-12d Means, such as mounting flanges, for securing box 10 to a support feature.

13a-13d Apertures through which attachment means (not shown), such as convention screws, nails, bolts, or the like, may extend to mount box 10 on a support feature.

14a & 14b Cable openings providing cable support and cable access to interior of box 10.

20a An exterior side panel of box 10.

22a An exterior end panel of box 10.

24b An interior side panel of box 10.

26b An interior end panel of box 10.

28a An exterior bottom panel of box 10.

30a-30d Plug and switch plate mounting means.

32 Connection flanges attaching and supporting 30a-30d, 32a, and 32b to interior end panels of box 10.

32a & 32b Plug and switch receptacle mounting means.

40 Block or wiring terminal in which wires with ground wires are fastened.

42 & 44 Block or wiring terminal in which electrical wires are fastened.

50 Fastening means for securing wires, a set screw, for example.
52 Aperture in which wires are positioned for fastening.
112 Junction box to house electrical conductor connectors.
114 Aperture for receiving attachment means for attaching an electrical device to 112.
116 Cable for containing electrical wires.
120 Non-conducting electrical conductor connector insert.
122 Cavity in which wires to be connected are positioned.
124 Aperture for receiving connector or fastening means 126.
126 Connector or fastening means for maintaining wires in contact.
132a Wire transporting electrons from electricity source to electrical device wire 132b.
132b Wire to transport electrons from 132a to electrical device.
133a Wire carrying electrons away from electrical device to electricity source wire 133b.
133b Wire transporting electrons from 132a to electrical source.
134a Grounding wire.
134b Grounding wire.
132d Wire connector means.
133d Wire connector means.
132d Wire connector means.
140 Electrical device.
142a Attachment means.
142b Aperture for attachment means 142a.
143 Switch.
150 Cover plate.
152a Attachment means.
152b Aperture for attachment means 152a.
153 Switch aperture.
160 Metal block.
170 Non-conducting cover plate.
215 Non-conducting junction box
216 Aperture for wire cable or the like.

It should be understood that the drawings are not necessarily to scale. In certain instances, details which are not necessary for an understanding of the present invention or which render other details difficult to perceive may have been omitted. It should be understood, of course, that the invention is not limited to the particular embodiments illustrated herein, but encompasses many embodiments as are discussed throughout the specification.

DETAILED DESCRIPTION

Referring now particularly to the drawings, FIG. 1 presents a perspective top view of the molded electrical connection box 10, which box is to be understood to be an exemplary embodiment of this invention. Box 10 demonstrates how the above mentioned disadvantages have been overcome. However, it should be noted that the disclosed invention is disposed to embodiments in various sizes, shapes, and forms. Therefore, the embodiments described herein are provided with the understanding that the present disclosure is intended as illustrative and is not intended to limit the invention to the embodiments described herein.

More particularly, FIG. 1 illustrates a molded electrical connection box 10 according to the teachings of the present invention. Box 10 consists of two end panels each having an exterior surface 22a and an interior surface 26b, two side panels each having an exterior surface 20a and interior surface 24b, and bottom panel with exterior surface 28a, wherein the end panels, side panels, and bottom panel are arranged to provide an inner volume that is to be used for the connection and storage of electrical and ground wires. Mounting flanges 12a-12d may extend from the bottom 28a and may be used to secure box 10 to a support feature, such as wall framing. It should be understood that the exact position of mounting flanges or other mounting means on the electrical conductor box may vary depending on need and such changes are within the scope of the present invention. Apertures 13a-13d, placed through mounting flanges 12a-12d allow for an attachment means (not shown), such as conventional screws, nails, bolts, or the like, to extend through the apertures to provide for mounting of box 10 on a support feature.

Figure 2:
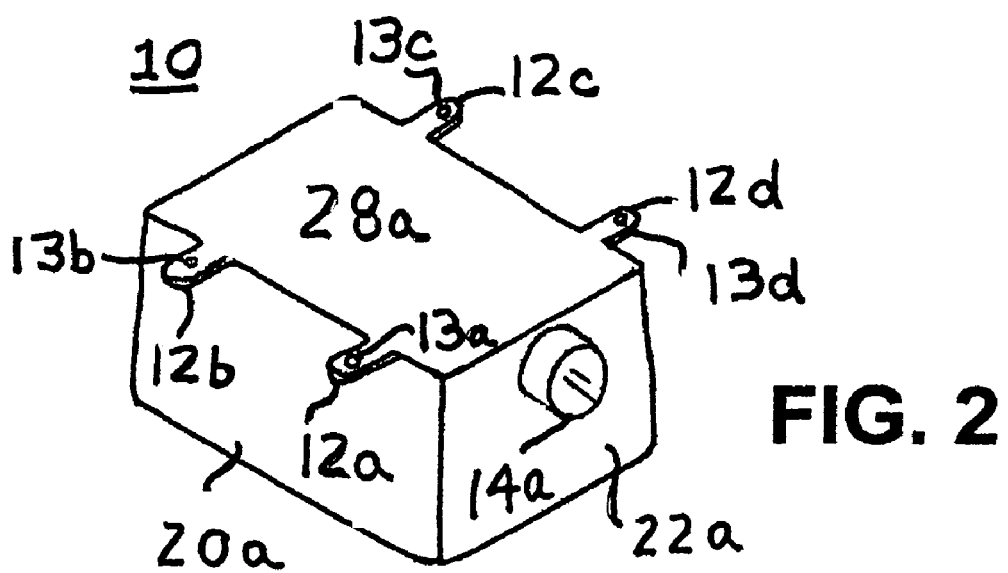
FIG. 2 is a perspective bottom view of the junction box as shown in FIG. 1.

FIG. 2, which provides a perspective view of the bottom of box 10, illustrates one example of mounting flanges 12a-12d integrally formed as an extension of bottom surface 28a of box 10, although, as mentioned above, the position, size, and style of the flanges or other mounting means may be changed, as required.

Extending through opposing sides of box 10 are cable openings and supports 14a and 14b providing for cable access to the interior of connector box 10 and for support of said cable so that the cable may be positioned in the inner volume of box 10 to make electrical connection to another electrical element within box 10. The examples illustrated in FIGS. 1 and 2 show cable openings 14a and 14b positioned through the end panels identified by their outer surface 22a and their inner surface 26b, respectively. Opening supports 14a and 14b are shown as being contiguous with the panels through which they extend, and additionally, may provide for another means of anchoring box 10 securely in place.

Also illustrated in FIG. 1, are pylons 30a-30d integrally formed as an internal part of molded electrical connector box 10 and functionally designed to provide for the reversible attachment of any standard receptacle, switch, or cover plate securely to the box. This attachment is accomplished by placing the desired cover (not shown) over the open front face of the box and by inserting any standard connection means, such as screws, through screw holes typically provided on such covers and into pylons 30a-30d, which are designed to accept and securely hold such connection means. Additionally, pylons 32a and 32b, also integrally formed as an internal part of molded electrical connector box 10, are functionally designed to provide in connector box 10 means for mounting an electrical device securely in the box 10, which, of course, is accomplished before a cover is placed over the box and the device secured to the box. Much like pylons 30a-30d, pylons 32a and 32b are designed to utilize any standard mounting means, including, but not limited to screws. Pylons 30a-30d and 32a and 32b are each supported and connected to the interior of end or side panels by a flange identified by reference number 32, as illustrated in FIGS. 3 and 4.

Figure 3:
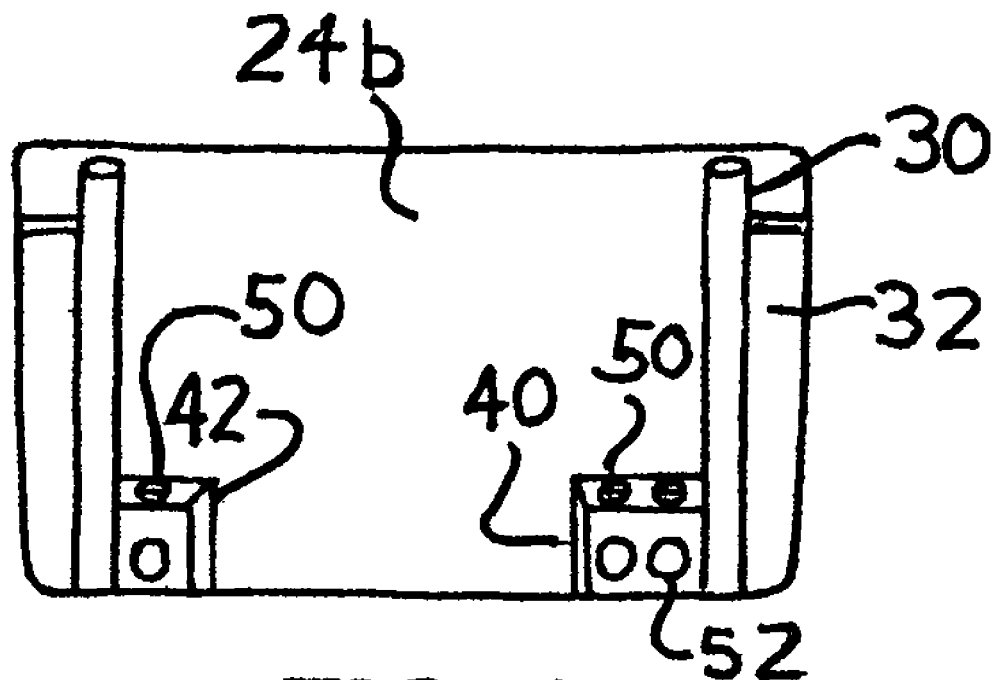
FIG. 3 is a partial perspective sectional view of an inner side panel of the junction box taken along line 3-3' of FIG. 1.

FIG. 3 provides a partial perspective sectional view taken along line 3-3' of FIG. 1 illustrating inner surface 24b of one side panel of the junction box. Also illustrated are connector blocks 40 and 42 shown as being integral parts of box 10. It is contemplated that the block terminals are made of a conducting material, such as a metal, but can be of any desired material. If the block terminals are made of a conducting material, they may or may not be coated with a non-conducting material.

Figure 4:
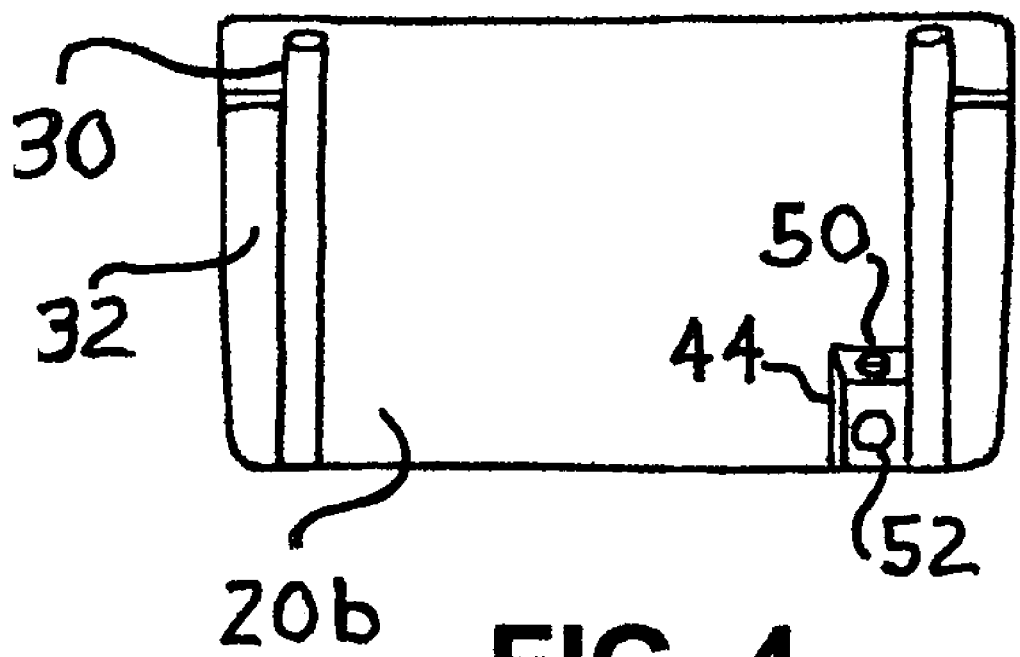
FIG. 4 is a partial perspective sectional view of the opposite inner side panel of the junction box taken along line 4-4' of FIG. 1.

FIG. 4 provides a partial perspective sectional view taken along line 4-4' of FIG. 1 of the inner surface of the side panel of the junction box that is diametrically opposite to the inner surface shown in FIG. 3. The entirety of box 10, including the internal components is molded of one piece, either from a plastic material, or from some other non-conducting material that would be suitable for a molding process. While any particular type of wiring terminal can be used in this instance, the exemplified preferred embodiment comprises block terminals, which, as mentioned, are integrally molded into box 10 during the molding process.

Two types of block terminals in the electrical box 10 are shown in FIGS. 3 and 4. Block terminals 42 and 44 in FIG. 3 and FIG. 4, respectively provide a housing in which electrical current carrying wires are connected to another electrical conductor or to an electrical device (not shown). Block terminals 42 and 44, should comprise at least two apertures, one for positioning therein the wires to be connected, which is illustrated as aperture 52 and a second aperture providing means for securely fastening the connected wires, which is illustrated as those apertures into which fastening means 50 is inserted. Comparatively, block terminal 40, as illustrated in both FIGS. 1 and 3, provides for grounding purposes. Like block terminals 42 and 44, block terminal 40 comprises at least two apertures, aperture 52 for the positioning of those wires that will provide a ground, and a second aperture providing means for fastening, which as illustrated is that aperture into which fastening means 50 is inserted.

To use the electrical connection box according to the principles of the present invention, one simply attaches the box to a support, which may be accomplished by using mounting means, such as mounting flanges 12a-12d. Once the box is attached to a desired support, at least one electrical conductor is inserted into the box via an opening, such as exemplified by cable openings 14a & 14b that provide for cable support and cable access to the interior of box 10. At this point the at least one electrical conductor is electrically connected to either another electrical conductor if the box is a junction box or to the wires emanating from an electrical device if the box is a receptacle box. The wires to be connected are inserted into a first aperture of a terminal block and secured therein by the secure placement of a securing means, such as a screw, into a second aperture of the terminal block, wherein the two apertures are connected so that the securing means may make secure contact with the wires. Thus, in this way a safe, secure connection is made between desired wires rapidly and economically. Once the conducting wires and ground are secured in the block terminals, if there is an electrical device it is now secured to the box via securing means inserted through apertures routinely provided in the device for just such a purpose and the apertures of pylons 32a and 32b. At this time a cover plate is placed over the box and secured in the usual manner.

If for any reason the connections made as described above are required to be disconnected, one simply reverses the process as follows. After taking the safety step of shutting off the electrical power, remove the cover plate, which removal is usually accomplished by simply unscrewing the screw-type cover plate securing means, detach the electrical device from the box, which detaching is usually accomplished by simply unscrewing the screw-type electrical device securing means from the apertures of pylons 32a and 32b, remove all fastening means 50 from their related apertures and remove the connected wires from aperture 52. At this point any connection made between a set of wires may be disconnected. This is accomplished without destroying any part of the electrical connector box so that the processes of connecting wires and disconnecting wires may be made without the use of wire-nuts and as often as required using the same box.

Figure 5:
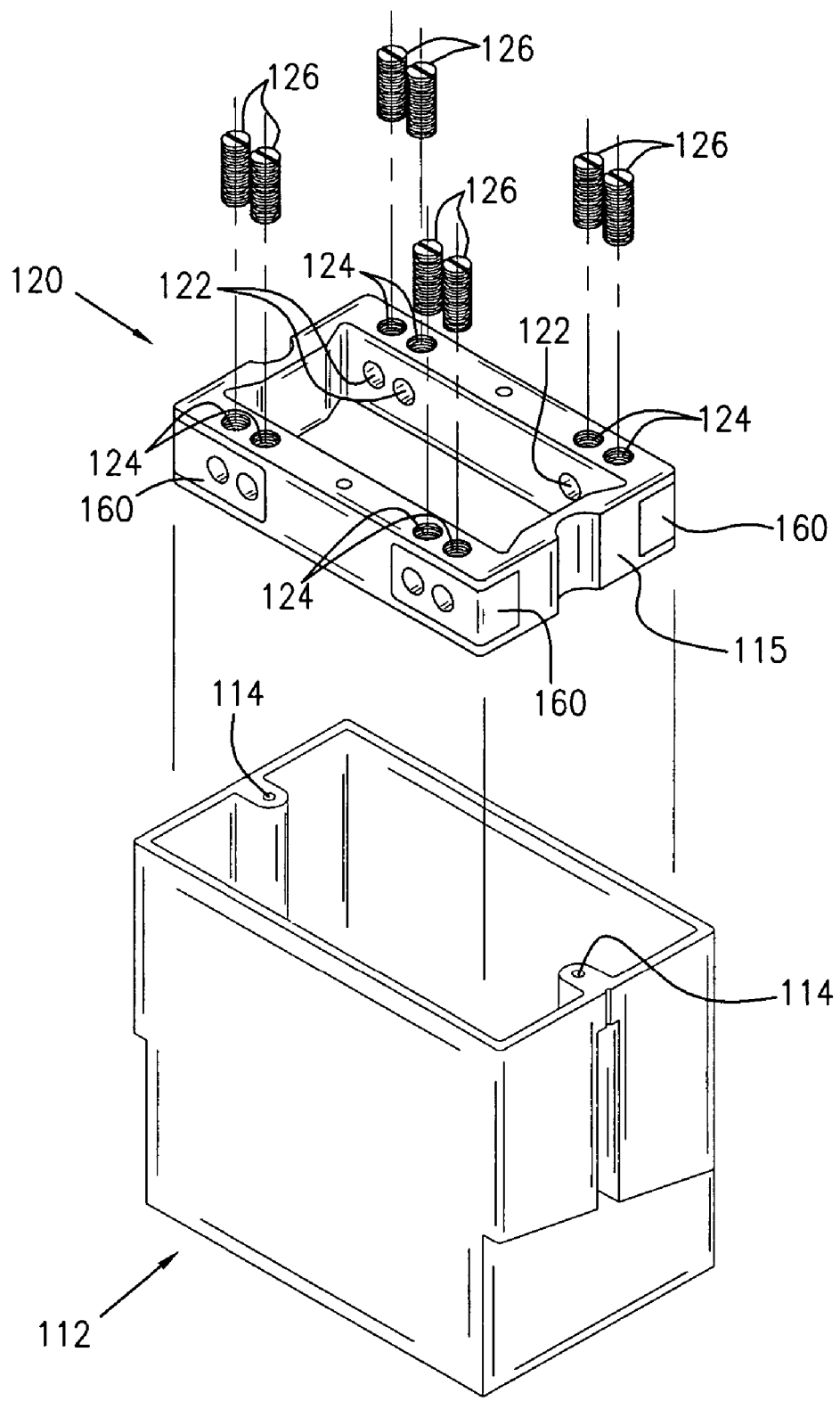
FIG. 5 is a perspective view of the junction box wire connector insert according to principles of the present invention.

FIG. 5, a perspective view, illustrates non-conducting electrical wire connector insert 120 according to principles of the present invention positioned for insertion into junction box 112. Non-conducting electrical wire connector insert 120 is essentially a reduced sized molded electrical connection box 10, as described above. As will be shown, insert 120 has all the connecting functionalities of electrical connection box 10 but in a frame that is sized for easy and rapid insertion into an existing junction box, providing for very low cost, yet efficient and secure wiring and rewiring, wherever and whenever required. In particular, non-conducting electrical wire connector insert 120 comprises frame 115 providing for at least one wire terminal 160 for receiving wires to be connected structurally integrated into said frame, wherein wire terminal 160 provides for at least one cavity 122 in which wires to be connected are positioned. The wires to be connected within wire terminal 122 are reversibly firmly connected by at least one means for fastening 126. At least one means 126 for reversibly firmly connecting the wires to be connected. Connecting means 126 securely, yet reversibly, connects the wires to be connected when it is received and tightened into one of the at least one apertures 124 for receiving connecting means 126. Fastening means 126 my be loosened and removed as easily and rapidly from aperture 124 as it is received and tightened into aperture 124. This means that wires may be both connected and disconnected without destroying any parts of the connecting means, is an attribute not possible when using presently available ubiquitous wire nuts. Another advantage of either the n molded electrical connection box 10 or the reduced-sized version of the connection box which is referred to as electrical wire connector insert 120 is the fact that a connection, such as a switch device, can be disconnected and removed from the junction box without disturbing any other connections present in the junction box.

Figure 6:
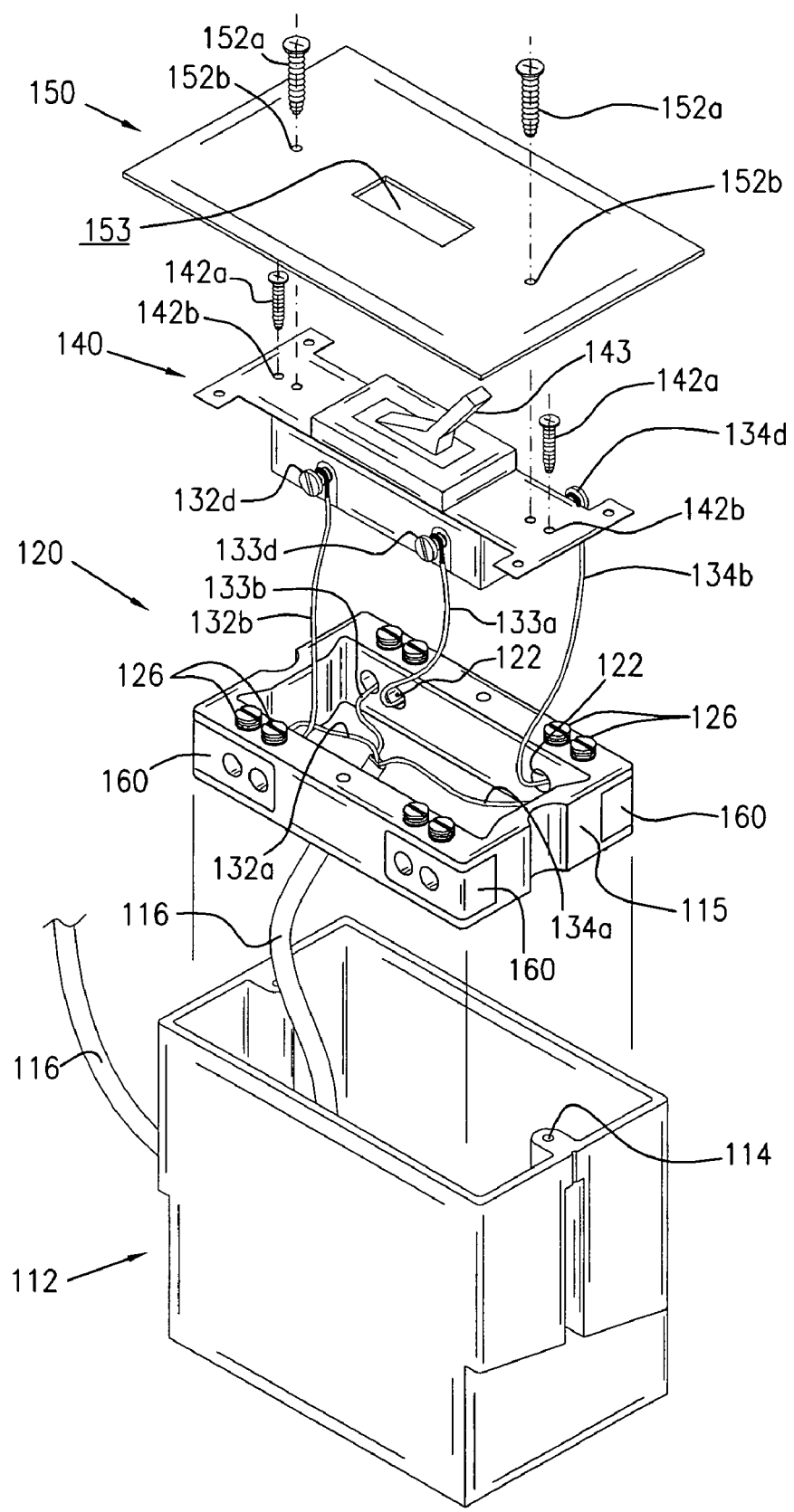
FIG. 6 is an exploded view of the junction box and insert, as shown in FIG. 1, along with an electrical device with its matching cover plate.

FIG. 6, an exploded view, illustrates the relationship between junction box 112, connection insert 120, an electrical device, which in this illustration is switch 140, and switch cover plate 150. In the example illustrated in FIG. 6, frame 115 of connection insert 120 is made of a non-conductive material, such as plastic. Into frame 115 metal connector blocks 160 are press-fitted. This construction, without any additional insulation about the metal blocks, provides connection boxes for use in junction boxes made of a non-conductive material, such as plastic. Each wire connector block 160 has at least one cavity 122 for accepting wires to be electrically connected. In the example illustrated in FIG. 6, it is should be noted that there are two cavities for each set of wires to be connected, i.e., one cavity per wire. Each of the two wires to be connected is positioned within one of the two of cavities per pair of cavities and is held in position in the cavity by one of the connector means 126, which are illustrated in the figures as set screws, but could be any comparable, known or yet to be known connection means. Set screw 126, once positioned in the relevant aperture 124, are tightened the reversible, secure connection is complete. As can be seen and appreciated, the insert is of extremely simple, streamlined, and economical construction and provides the same advantages as the full-sized connector box. The number of wiring terminals in an insert is determined by the number of connections required in each junction box. The low cost of the inserts, however, would permit multiple wiring terminals to be a part of each box, so that various box models would not be required.

Figure 7A:
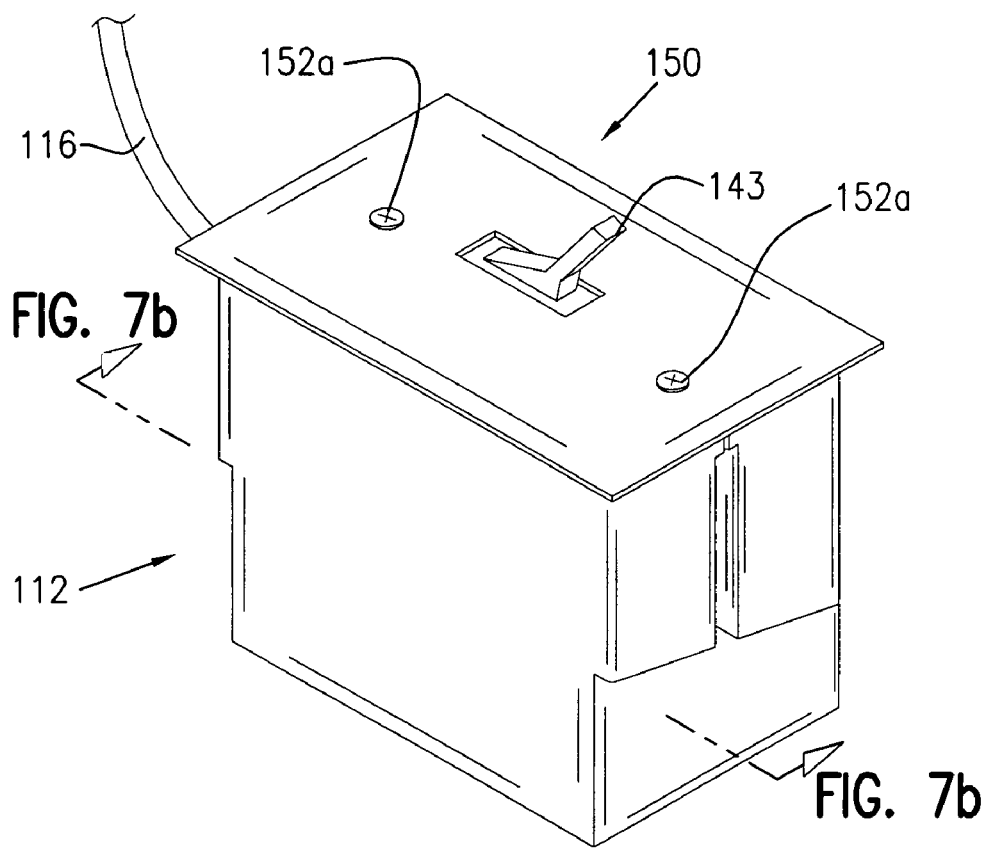
FIG. 7a is a perspective view of a junction box with the insert of this invention, an electrical device, and a cover plate of the electrical device in position for use.

FIG. 6 further illustrates, for exemplary purposes, the "ac" power supply traveling to and from switch device 140 through wires 132a and 133b that are housed, along with ground wire 134a, in cable 116. In this example, the power travels to switch 140 through power source wire 132a and switch wire 132b. The wires carrying electrons in the other direction are switch wire 133a and power wire 133b. Switch 140 is grounded via wires 134b and 134a. Wire connectors, 132d, 133d, and 134d secure wires 132b, 133a, and 134b to device 140, respectively. Once all of the required wire connections are made, insert 160, electrical device 140, and device cover plate 150 are positioned into junction box 112. Insert 160 and electrical device 140 are secured to each other and to junction box 112 using securing means 142a that are inserted first into apertures 142b and then apertures 114 and tightened. Device cover plate 150 is then positioned on switch 140 so that switch 143 extends out through switch aperture 153 and then secured to electrical device 140 via securing means 152a that are inserted through apertures 152b to achieve a junction box ready for use, as illustrated in FIG. 7a.

Figure 7B:
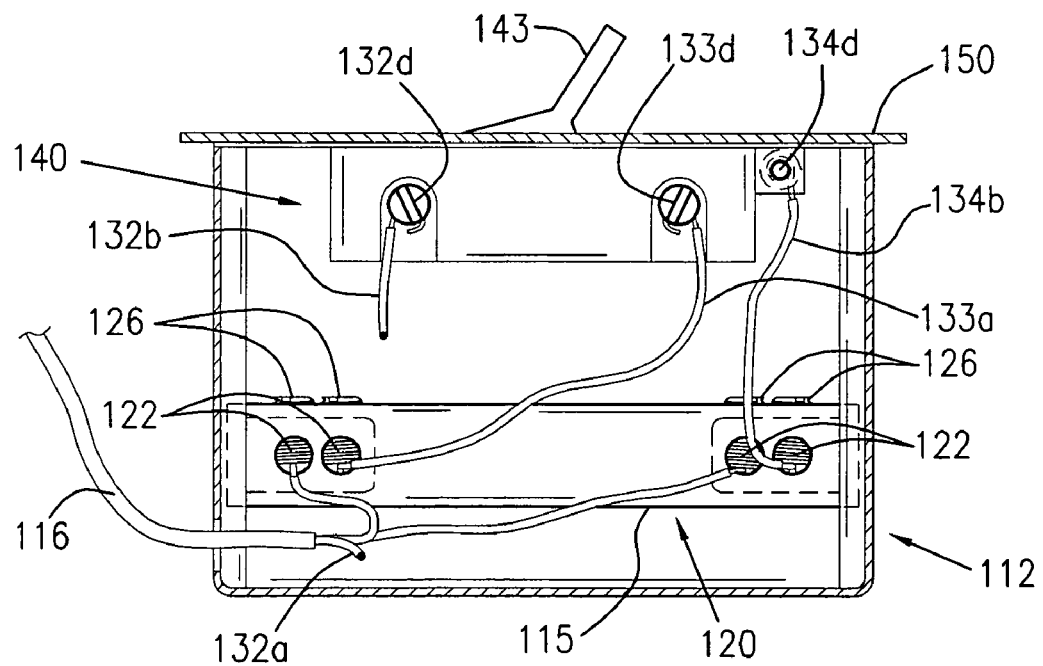
FIG. 7b is a sectional plan view of the junction box taken along line 7a-7a of FIG. 7.

FIG. 7b, a sectional plan view of the junction box taken along line 7a-7a of FIG. 7, illustrates how organized the wires inside the junction box are when the present invention is used to make the wire connections. FIG. 7b also illustrates how much room there is left in the box. This room provides for more connections to be made, if desired. Moreover, the space that is not required when wires are connected using the present invention provides for safer and more secure connections. Wire nuts require a substantial amount of space for each connection, which often leads to wire crowding inside of a junction box. Electricians have no recourse but to pack the wires together as best they can. Cramming wires into a junction box, however, often causes the wire connection to loosen, and even to break. This, of course, may result in, not only an inconvenience when the connection does not work, but in a worst case scenario, can also result in a fire hazard.

Figure 8A:
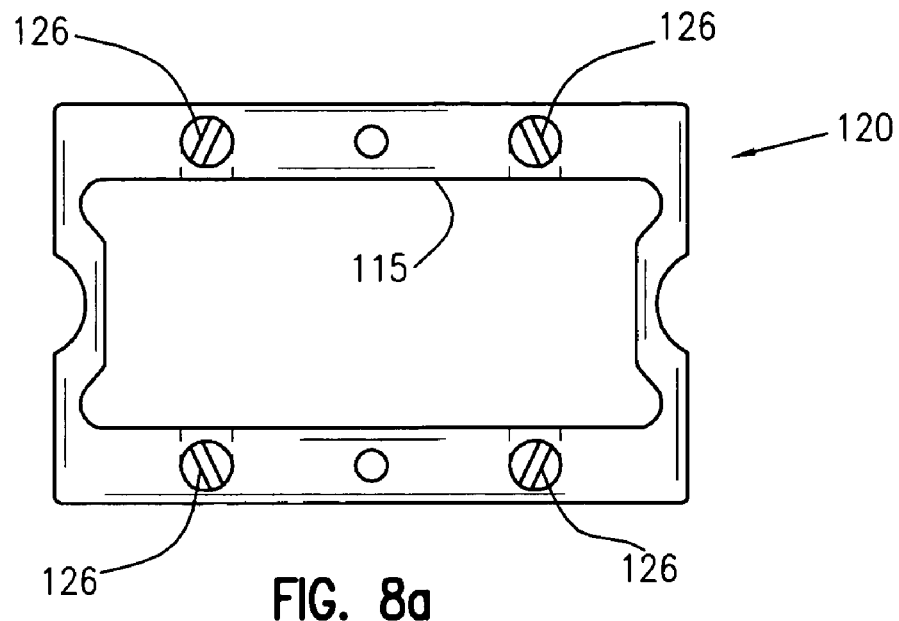
FIG. 8a is a top plan view of a junction box wire connector insert made from non-conductive material utilizing one cavity and one hollow per set of wires to be connected.
Figure 8B:
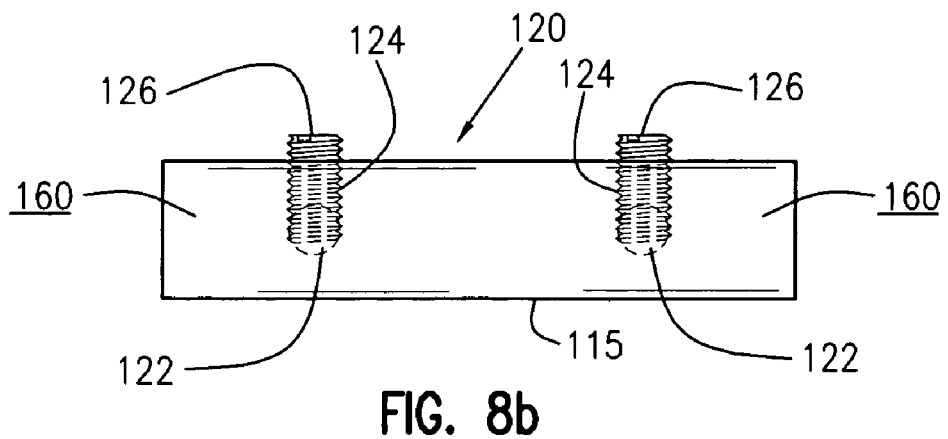
FIG. 8b is a side plan view of the insert as illustrated in FIG. 8.
Figure 8C:
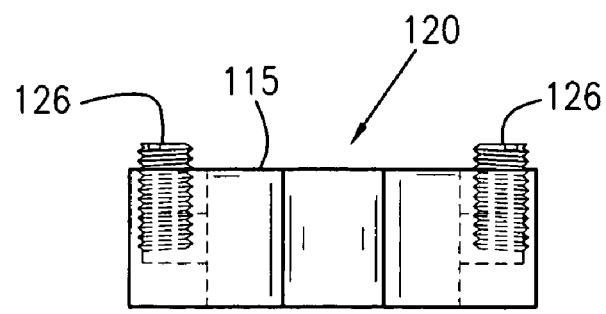
FIG. 8c is a end plan view of the insert as illustrated in FIG. 8.

FIG. 8a, a top plan view, FIG. 8b, a side plan view, and FIG. 8c, an end plan view illustrate a junction box wire connector insert frame 120 made entirely from non-conductive material utilizing a single cavity 122 per at least one wire connection. Each cavity 122 is in communication with a hollow 124 for receiving wire connecting means 126. After the wires to be connected are positioned within a cavity 122 a connecting means 126 is positioned within hollow 124 and tightened to securely, and reversibly, connect one or more sets of wires. Connecting means 126 is likely, but does not have to be, a conducting material means.

Figure 9A:
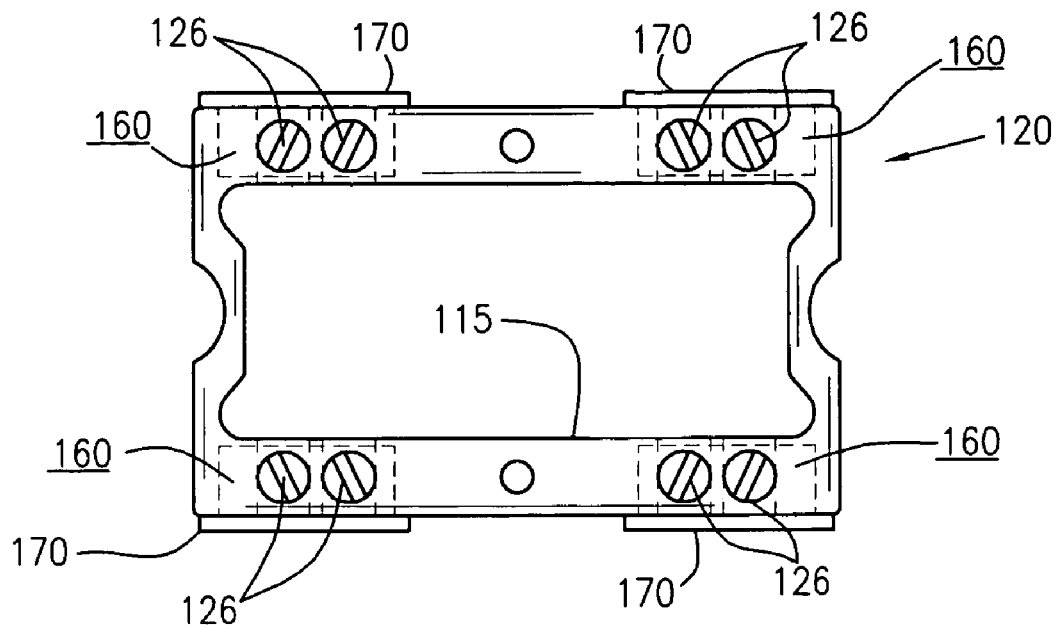
FIG. 9a is a top plan view of a junction box wire connector insert made from non-conductive material fitted with conducting connecting blocks.
Figure 9B:
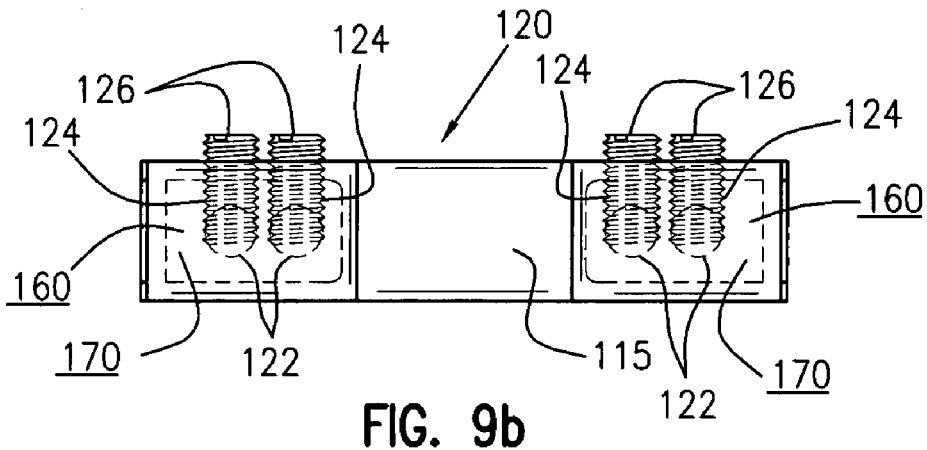
FIG. 9b is a side plan view of the insert as illustrated in FIG. 9.
Figure 9C:
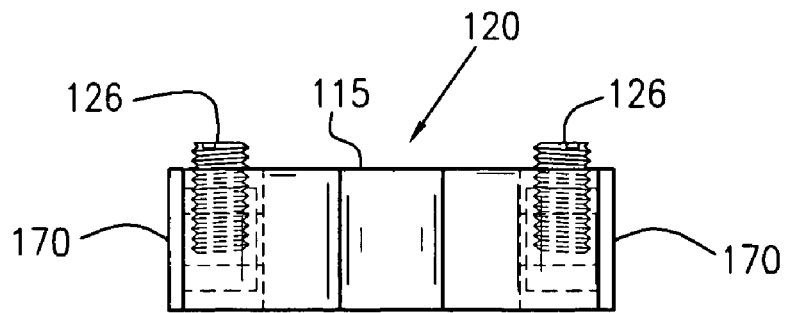
FIG. 9c is a end plan view of the insert as illustrated in FIG. 9.

FIG. 9a a top plan view, and FIG. 9b, a side plan view, illustrate a junction box wire connector insert 120 with frame 115 made from non-conductive material, such as plastic, fitted with conducting connecting blocks 160 that provide the connecting structure basically identical to the examples described above. In this particular example, each conducting block has at least two cavities per electrical wire connection to be made. Into one cavity is placed a wire carrying power from a power source to a wire attached to an electrical device, such as a switch, for example, and into a second cavity is placed the wire that is attached to the electrical device. Although the wires are emplaced into physically separate cavities, they are in electrical connection, due to the presence of the conducting material from which the block is made. To reversibly secure the wire connection within the cavity, a securing means 126, such as a set screw, is positioned within a hollow 124 and tightened. Tightening of the screw prevents the wires from inadvertently becoming disconnected, yet easy and rapidly accomplished loosening of the securing means allows the connected wires to be disconnected, if necessary, and reconnected, if desired without any need to cut the wires or to prevent further use of the connecting device. The fixed position of the wiring terminals ensures that once the connected wires are fixedly secured and protected by the securing means, the wire connection need not be disturbed and thus is safe from having the connection broken, unlike connections that are made within moveable wire-nuts. In this example, which shows an example of a connector insert that may be used in a conducting junction box, insulating plates are secured over the conducting block, thus preventing any electrical contact between the conducting block and a conducting junction box.

Figure 10A:
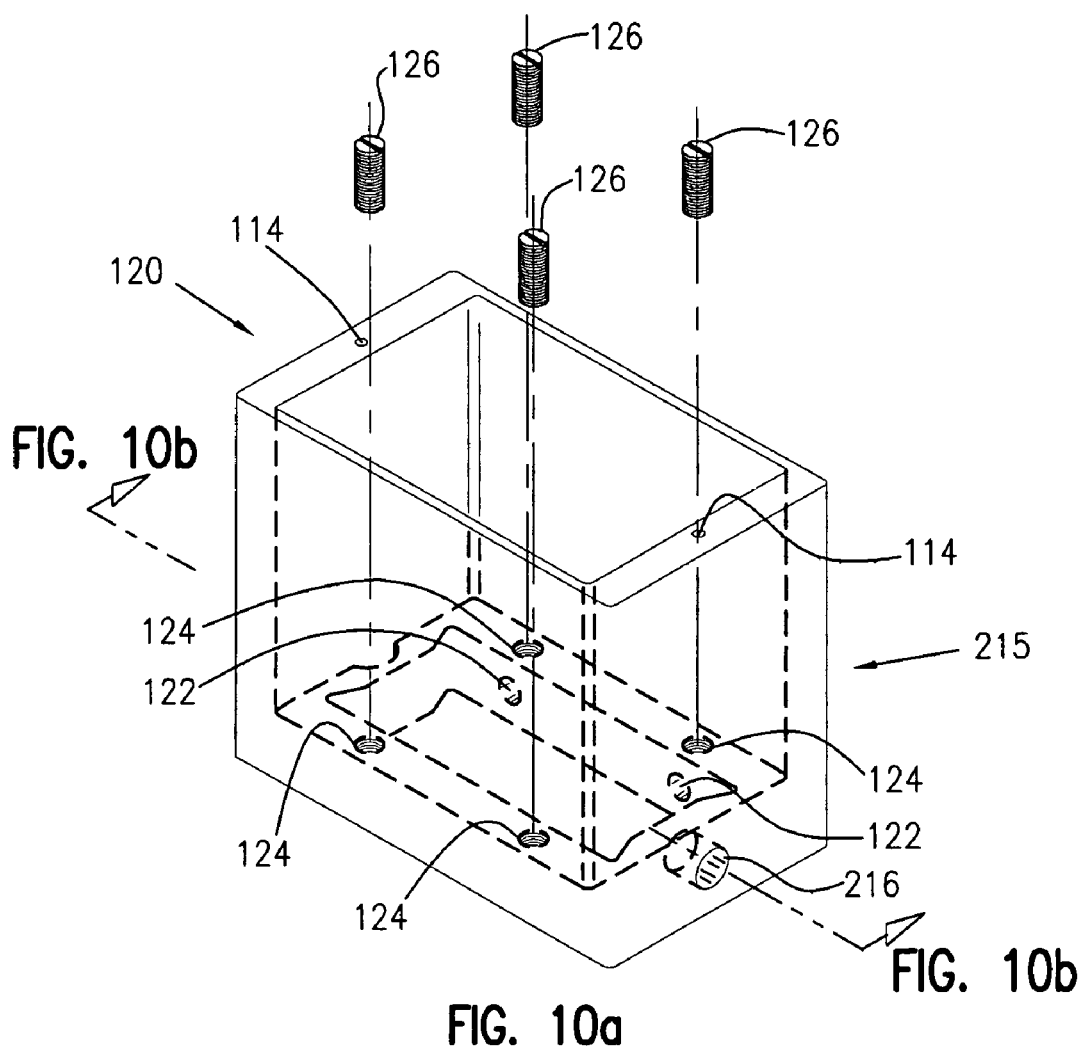
FIG. 10a is a perspective top view illustrating a non-conducting junction box having non-conducting terminals that are molded integral with the box according to the principles of the present invention.
Figure 10B:
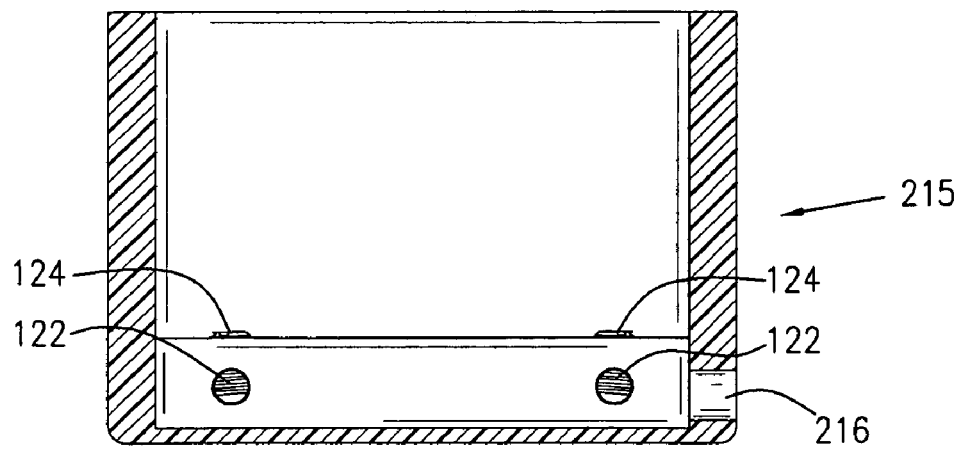
FIG. 10b is a section view taken along 10b-10b further illustrating a non-conducting junction box.

FIG. 10, a perspective top view, illustrates non-conducting junction box 215 having non-conducting terminals that are molded with the box forming one integrated unit according to principles of the present invention providing for a molded, non-conducting, electrical receptacle connection box, comprising at least one non-conducting wire terminal for receiving wires to be connected, the wire terminal structurally molded within the frame having: i. at least one non-conducting wire terminal cavity 122 for receiving wires to be connected; ii. at least one means 126 for reversibly firmly connecting the wires to be connected within the wire terminal cavity and, ii. at least one non-conducting hollow structurally 124 integrated into the frame in communication with the cavity, the hollow for receiving the at least one means for reversibly firmly connecting said wires to be connected within said cavity, wherein the box has at least one opening 215, as shown in exemplary FIG. 10, located in a side panel, configured for receiving at least one wire power input cable to be connected. It is to be understood that the number of non-conduction wiring terminal cavities will be as desired, which, of course, depends on the use to which the junction box is to be put. It will also be understood that the at least one means 126, while illustrated as a set screw in FIG. 10, can be any other desired type of wire connection means, for reversibly firmly connecting wires together within the non-conducting wiring terminal, it is to be equally understood that the number of number of connecting means for reversibly firmly connecting wires also will be as desired. The fully non-conducting electrical receptacle connection box provides for low-cost, safe, reversible, firm, connection of wires that are to be connected. The electrical receptacle connection box provides all of the functions of presently available junctions without the need for wire nut or pigtail connectors providing for reversible, safe, and sturdy electrical wire connections. Moreover, the present invention provides for desired connections to be removed with the need for disconnecting all of the connections made in the junction box. Being able to provide for a junction box and the required wire connectors to be made in a one step molding process means significantly reducing the cost of the several parts now required in order to make wire connections.

Thus, it has been shown that the present invention satisfies the urgent need in the art for a molded insert for use in an available junction box and for a molded box-like container that eliminates the need for the ubiquitous nut connectors of questionable safety that are presently relied on to connect conductor wires inside a junction box. The molded box and insert are of simple, streamlined, molded, economical construction and, according to the principles of the present invention, provides for rapid and repeated pre-wiring, wiring, or re-wiring of conventional residential, commercial, or industrial wiring systems.

The foregoing description, for purposes of explanation, used specific and defined nomenclature to provide a thorough understanding of the invention. However, it will be apparent to one skilled in the art that the specific details presented are not required in order to practice the invention and are not intended to be exhaustive or to limit the invention to the precise forms disclosed. Those skilled in the art will recognize that many changes may be made to the features, embodiments, and methods of making the embodiments of the invention described herein without departing from the spirit and scope of the invention. The invention is limited only by the claims.

What is claimed is:

1. A wire connector insert, for insertion into a junction box, comprising:
   a wire connector insert for use in a junction box, said wire connector insert and said junction box configured for receiving and connecting an electrical device to a conductor, said electrical device being a switch electrical device or a plug electrical device, said wire connector insert comprising:
   a. a frame for use within and unaffixed to the junction box;
   b. at least one wire terminal for receiving wires to be connected, said wire terminal structurally integrated into said frame,
   c. at least one means for reversibly firmly connecting said wires to be connected within said wire terminal.

2. The insert, as recited in claim 1, further comprising wherein said frame is sized and shaped to be received and held snugly within a junction box.

3. The insert, as recited in claim 1, further comprising wherein said at least one wire terminal is made of a non-conducting material.

4. The insert, as recited in claim 1, further comprising wherein said frame is made solely of a non-conducting material.

5. The insert, as recited in claim 4, further comprising wherein said non-conducting material is a plastic.

6. The insert, as recited in claim 4, further comprising wherein said non-conducting material is a ceramic.

7. The insert, as recited in claim 4, further comprising wherein said non-conducting material is a glass.

8. The insert, as recited in claim 1, further comprising wherein said at least one wire terminal is made of a conducting material.

9. The insert, as recited in claim 8, further comprising wherein said at least one wire terminal is insulated from its environment.

10. A wire connector insert, comprising:
    a wire connector insert for use in a junction box, said wire connector insert and said junction box configured for receiving and connecting an electrical device to a conductor, said electrical device being a switch electrical device or a plug electrical device, said wire connector insert comprising:
    a. a frame for use within and unaffixed to said junction box;
    b. at least one wire terminal cavity for receiving wires to be connected, said cavity structurally integrated into said frame;
    c. at least one means for fastening said wires to be connected, and
    d. at least one hollow in communication with said cavity, said hollow for receiving said at least one means for reversibly fastening said wires to be connected within said cavity.

11. The insert, as recited in claim 10, further comprising wherein said insert provides for simultaneously connecting a plurality of sets of wires to be connected.

12. The insert, as recited in claim 10, further comprising wherein said frame is sized and shaped to be received and held snugly within a junction box.

13. The insert, as recited in claim 10, further comprising wherein said frame is made of a non-conducting material.

14. The insert, as recited in claim 10, wherein at least one of said cavities further comprises two cavities for receiving wires to be connected and at least one of said hollows further comprises two hollows each hollow in communication with one cavity for wire connection.

15. The insert, as recited in claim 10, further comprising wherein said frame is made of a non-conducting material having at least one non-conducting connection block for connecting said wires to be connected, said non-conducting block molded together with and within said frame.

16. The insert, as recited in claim 10, further comprising at least one conducting connection block for connecting said wires to be connected, said conducting block positioned within said frame.

17. The insert, as recited in claim 16, further comprising wherein said at least one conducting block is electrically insulated from the environment outside of said frame.

18. The insert, as recited in claim 16, further comprising wherein said at least one cavity for receiving wires to be connected and said at least one hollow in communication with said cavity for receiving wires to be connected are positioned within said conducting block.

19. The insert, as recited in claim 18, wherein at least one of said cavities further comprises two cavities for receiving wires to be connected and at least one of said hollows further comprises two hollows each hollow in communication with one cavity.

20. A molded, non-conducting electrical connection junction box comprising:
    a molded non-conducting electrical connection junction box for receiving and connecting an electrical device to a conductor, said electrical device being a switch electrical device or a plug electrical device, said junction box comprising:
    a. a non-conducting frame molded as part of the junction box;
    b. at least one non-conducting wire terminal for receiving wires to be connected, said wire terminal structurally molded within said frame, comprising:
       i. at least one non-conducting wire terminal cavity for receiving wires to be connected;
       ii. at least one means for reversibly firmly connecting said wires to be connected within said wire terminal cavity, and,
       iii. at least one non-conducting hollow structurally integrated into said frame in communication with said cavity, said hollow for receiving said at least one means for reversibly firmly connecting said wires to be connected within said cavity.

* * * * *